Figure 1:
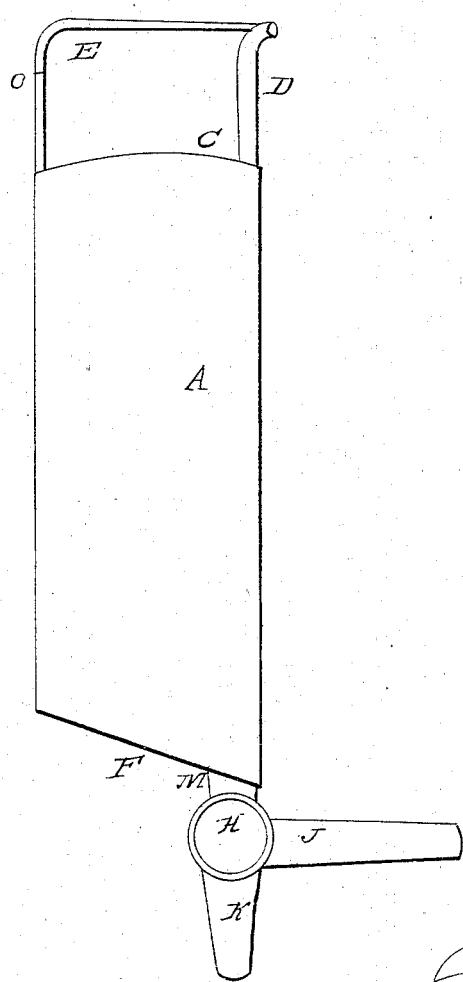
Figure 2:
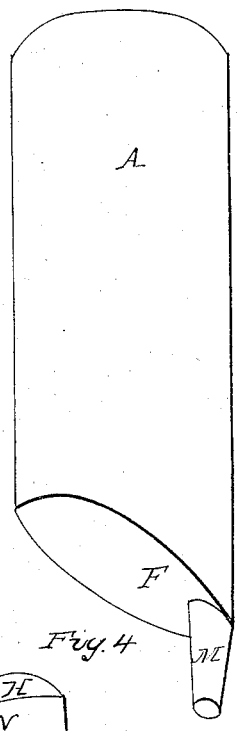
Figure 3:
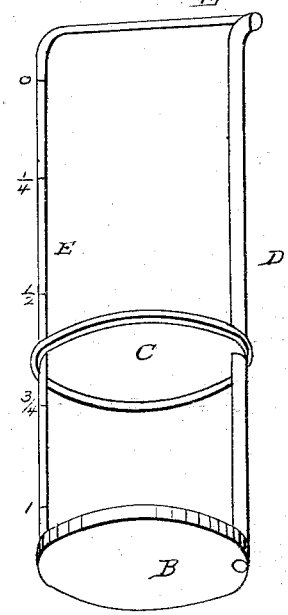
Figure 4:
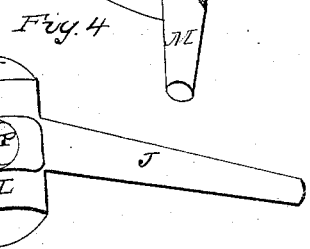

G. H. HENKEL.

Graduated Faucet Measure.

No. 48,556.

Patented July 4, 1865.

WITNESSES

INVENTOR
Geo. H. Henkel

UNITED STATES PATENT OFFICE.

GEORGE H. HENKEL, OF MIDDLETOWN, OHIO.

IMPROVEMENT IN GRADUATED FAUCET-MEASURES.

Specification forming part of Letters Patent No. 48,556, dated July 4, 1865.

*To all whom it may concern:*

Be it known that I, GEORGE H. HENKEL, of Middletown, in the county of Butler and State of Ohio, have invented a new and Improved Graduated Faucet-Measure for Measuring Liquids; and I do hereby declare that the following is a full, clear, and exact description of the construction and operation of the same, reference being had to the accompanying drawings, making a part of this specification, in which—

Figure I represents my improved faucet-measure entire, as when applied to a cask from which a liquid is to be measured. Fig. II represents the measure with the faucet-graduating rod, air-tube, disk, or piston, and cover removed. Fig. III represents the disk, cover, tube, and rod in their connected form removed from the measure. Fig. IV represents the faucet detached.

My invention consists in the construction, arrangement, and combination of a frame composed of a rod, tube, and disk placed within a tubular vessel or measure, and a faucet connecting the measure with a cask for drawing out and measuring any given quantity of liquid within such cask or barrel, as herein more fully described.

In the drawings, A indicates the measure, which has an inclined bottom, F.

The letters B E D indicate the frame, which is placed within the measure A.

C indicates the cover of the measure, and this is provided with two holes, through which the rod E and tube D slide for the purpose of adjusting the disk B within the measure, as will be hereinafter explained.

M is a tapering tube opening or communicating with the measure A.

The faucet represented in Fig. IV is constructed of a central bowl or ring, L, of cylindrical or conical form, provided with tubes J K, attached to the bowl at right angles to each other.

N indicates an elongated opening or aperture in the bowl L of the faucet, and H denotes the spigot or stop-cock, which is inserted in the cylindrical bowl L. The spigot is perforated with a hole, P, corresponding in size with tube M, and for its insertion, as will be set forth in describing the operation of my invention. The advantage of making the bowl L and spigot H of a slightly-tapering form instead of a cylindrical will permit the spigot to be adjusted in the bowl to compensate for wear, and thus prevent leakage.

The long arm of rod E is graduated, as indicated by figures, to determine the quantity of liquid to be drawn from the cask or barrel at a time.

The tube D being open at each end serves as a ventiduct for supplying the air to the measure or the cask.

The disk B is provided with suitable packing around its periphery to prevent leakage.

Having now described the several parts of my improved measure and the arrangement of them in respect to each other, I will proceed to specify the manner of applying and using the same.

The tube J of the faucet is inserted in the cask or barrel of any kind of liquid, so that the tube K shall be below the bowl L, with its spigot H therein, as seen in Fig. IV. The frame (represented in Fig. III) being placed within the cylindrical measure A and the cover C closed down upon the top thereof, the tube M is inserted in the hole P, the measure standing vertically at the side of the barrel, in which tube J is inserted. The measure being now ready for use, the short arm of the rod E (which connects the tube D with its long arm, both projecting above the cover of the measure) is used as a handle to adjust disk B within the measure to draw out any desired quantity of liquid, the amount being readily determined by withdrawing the frame, so as to bring the figure on the rod E which denotes the required quantity immediately above the cover C. This adjustment being concluded, the operator revolves the spigot H one-quarter of its circumference, the tube M traversing the elongated opening N of the bowl L. This is accomplished by turning down the measure in the arc of a circle from its vertical to a horizontal position, the spigot H serving as the axis of a hinge for this purpose.

By reference to Fig. I it will be observed that when the measure is brought into a horizontal position the tube M, inserted in opening P, will be brought into line and communication with tube J, thus causing the measure to be filled to the extent determined by the adjustment of the disk-rod E. When the measure is full the outer curved end of tube D will indicate the fact by the presence of the liquid therein. The measure will then be returned to its vertical position, thereby causing the spigot H to revolve and close the tube J communicating with the barrel, and bring the tube M in connection with tube K, which latter is the egress-tube conveying the liquid from the measure to a vessel beneath it.

It will be observed that in using my improved measure the spigot serves as a cut-off or stop-cock for the ingress and egress openings alternately or at the same time.

It will be readily observed that a single measure, with its adjustable disk and its connections, may be used for any number of casks provided with the faucet represented in Fig. IV. It is therefore adapted for use in retail stores, where several kinds of sirups or other like commodities are sold, as a single measure entirely secure from flies or other insects will serve the purpose of several sets of measures which are now in use and exposed to the insects and dust of the retail shops in which they are used.

My improved graduated faucet-measure may be made of any suitable material. I have had it constructed by casting of iron, but other metals may be used for the purpose. When not in use I place a tube over the opening of the egress-tube K, which protects it from insects and saves the drippings, which would otherwise fall to the ground and be lost.

Having fully described the construction and operation of my improvement in measures for liquids, what I claim as new, and desire to secure by Letters Patent, is—

1. The frame D E B, in combination with the measure A, arranged and operating in the manner and for the purpose substantially as described.

2. The faucet, constructed in the manner described, in combination with the measure A, to operate in the manner and for the purpose described.

In witness whereof I have hereunto set my hand this 19th day of August, A. D. 1864.

GEO. H. HENKEL.

Witnesses:
    H. P. K. PECK,
    W. C. WARD.